US006784227B2

(12) United States Patent
Simon et al.

(10) Patent No.: US 6,784,227 B2
(45) Date of Patent: Aug. 31, 2004

(54) CROSSLINKING BASE LAYER FOR FIXING INTERLININGS ACCORDING TO DOUBLE DOT AND PASTE PROCESS

(75) Inventors: Ulrich Simon, Herne (DE); Guenther Koehler, Marl (DE)

(73) Assignee: Degussa AG, Duesseldorf (DE)

( * ) Notice: Subject to any disclaimer, the term of this patent is extended or adjusted under 35 U.S.C. 154(b) by 449 days.

(21) Appl. No.: 09/973,890

(22) Filed: Oct. 11, 2001

(65) Prior Publication Data

US 2002/0042455 A1 Apr. 11, 2002

(30) Foreign Application Priority Data

Oct. 11, 2000 (DE) .......................................... 100 50 231

(51) Int. Cl.[7] .............................. C08F 9/10; C08L 83/00; B41F 17/00; B05D 7/00
(52) U.S. Cl. ....................... 523/211; 524/837; 525/375; 427/221; 101/36
(58) Field of Search .......................... 523/211; 524/837; 525/375; 427/221; 101/36

(56) References Cited

U.S. PATENT DOCUMENTS

| 5,264,515 | A | | 11/1993 | Cody et al. |
| 6,300,413 | B1 | | 10/2001 | Simon et al. |
| 6,344,238 | B1 | * | 2/2002 | Schmitt et al. ............. 427/202 |
| 6,664,318 | B1 | * | 12/2003 | Bymark et al. ............. 524/261 |

FOREIGN PATENT DOCUMENTS

| DE | 198 21 355 A 1 | 11/1999 |
| EP | 0 940 461 A1 | 9/1999 |

* cited by examiner

Primary Examiner—Tae H. Yoon
(74) Attorney, Agent, or Firm—Oblon, Spivak, McClelland, Maier & Neustadt, P.C.

(57) ABSTRACT

A microencapsulated adhesive component, comprising a cross-linking constituent microencapsulated with a silanized polybutadiene, wherein the reactive constituent has been first reacted in the melt with cross-linking, thereby resulting in a cross-linkable hot-melt adhesive component for coating and/or laminating surface formations.

19 Claims, No Drawings

CROSSLINKING BASE LAYER FOR FIXING INTERLININGS ACCORDING TO DOUBLE DOT AND PASTE PROCESS

BACKGROUND OF THE INVENTION

1. Field of the Invention

The present invention relates to a process for manufacturing a micro-encapsulated cross-linkable hot-melt adhesive coating based on an aqueous paste comprising a micro-encapsulated polyisocyanate dispersion and a commercially available amine-terminated copolyamide or copolyester for the manufacture of a base dot as a strike back barrier in double dot coating. The upper dot comprises an amine-regulated copolyamide for ensuring good bonding to the lower dot. More particularly, the invention relates to a hot-melt adhesive compound for a grid-like coating of fixable interlining materials for the garment industry, in particular for outerwear.

2. Description of the Background

In the interests of solving the problems of reduced washing and dry cleaning resistance of fabrics, as well as weaker adhesion, improved hot-melt compounds have been developed, as have improved coating technologies. Duo dot or double dot coatings are described in patents DEB 22 14 236, DE-B 22 31 723, DE-B 25 36 911 and DE-B 32 30 579, for example.

The coating carriers were improved according to the state of the art in that finer yarns with fine-denier single fibers including the microfiber range and synthetic yarns such as high bulk acrylic or polyester yarn are used. The fabrics which were originally used have been replaced extensively by stitch-bonded fabrics, wherein the latter materials represent a combination of nonwoven and woven fabrics. These combinations result in very soft, though very open structures which place higher demands on coating methods and hot-melt adhesive compounds, in particular with respect to strike back and bleed-through of the hot-melt adhesive compound.

Because of costs and quality reasons, there has been a noticeable drop in the amount of coating applied per $m^2$ of interlining material. Whereas previously coating quantities of 15 to 20 $g/m^2$ were common, nowadays the coating quantities range from 7 to 12 $g/m^2$.

Despite the small quantities, adequate adhesion and fastness must be guaranteed, that is, the hot-melt adhesive may not penetrate into the interlining, otherwise it is no longer available for actual adhesion.

The investigation leading to the present invention was to find an effective strike back barrier which exhibits high bonding strength, good bonding of the upper dot on the base layer and good washing and dry cleaning resistance, as well as having a sterilizing capacity, with a reduced quantity of coating material. Another advantage would be that a higher level of thermal stability under load is achieved.

The state of the art is such that a range of strike back barriers is known, such as cross-linking acrylate and polyurethane dispersions and powder-filled pastes based on high-melting copolyamides and polyethylene and high-viscosity thermoplastic polyurethane powders. All of these systems have more or less major disadvantages when applied to rough, napped interlinings and in their bonding to the upper dot or in their wash-resistance.

In the case of coatings of self-cross-linking acrylate or polyurethane dispersions, partial cross-linking frequently occurs during coating, which may result in a coating forming on the template and thus blockage of the template holes. Extensive cleaning of the plant is then required. When production-related downtime occurs, the downtime can also cause major difficulties and disturbances to the point that the templates become unusable. Also, when the material is being applied, bonding of the upper dot to the base layer is a problem. The high-viscosity powder-filled systems based on polyamide, polyethylene and polyurethane generally do not satisfy the resistance to strike back that is required.

To date there has been no success in creating a stable cross-linked system for the base dot. The isocyanates preferably used for this purpose were unable to be stabilized against water (matrix for coating pastes) or the activation temperatures required for crosslinking (greater than 150° C.) were excessive.

For special applications where the activation temperature can be higher (>150° C.), for example, for fixing shirt collars, internally blocked polyisocyanates, e.g. dimerized polyisocyanates, may be employed. Powder mixtures of this polyisocyanate and the amine-terminated copolyamide or copolyester can also be processed by means of other application techniques such as by powder dispersion or powder dot. At the present time, polyethylene with melting points of 110° C. to 120° C. or higher-melting polyamides in the melting range of 130° C. to 160° C. have been used for fixing shirt collars.

Isocyanates have had to be stabilized against water or against diffusion of humidity to ensure activability at relatively low temperatures.

SUMMARY OF THE INVENTION

Accordingly, one object of the present invention is to provide an effective strike back barrier which exhibits high bonding strength, good bonding of the upper dot on the base layer even on rough bases and good washing and dry cleaning resistance, as well as a sterilizing capacity with a reduced quantity of coating material.

Another object is to achieve increased thermal stability under load for the hot-melt adhesive coating and to facilitate processing of the dispersions, as well as preventing the templates from becoming blocked.

Still another object of the invention is to clearly improve the sensitivity of the isocyanate to humidity.

Briefly, these objects and other objects of the present invention as hereinafter will become more readily apparent can be attained by a process comprising micro-encapsulating a cross-linking constituent with a silanized polybutadiene, the reactive constituents of the cross-linking constituent has been first reacted in the melt with cross-linking, thereby manufacturing a cross-linkable hot-melt adhesive compound for coating and/or laminating surface formations.

DETAILED DESCRIPTION OF THE PREFERRED EMBODIMENTS

Silanized polybutadiene, which forms stable and water-impermeable capsules on contact with water or moist steam atmospheres, is suitable as a capsule material. It is known that silanized polybutadienes may be employed for micro-encapsulation, but their applicability in conjunction with isocyanates and amines was surprising. It would have been assumed that isocyanate or amine and silane react with one another so that the isocyanate which generates the hot-melt adhesive is deactivated or destroyed and is no longer available for hot-melt adhesive formation for the intended use. It would also have been assumed that isocyanate and the moist medium required for cross-linking or generating the capsule structure of the silanized polybutadiene in situ is damaging to the isocyanate in that it immediately hydrolyzes. However, the objective of the present invention has now been reached with an isocyanate, having more than 2 free NCO groups and a melting range of 110 to 130° C., e.g., trimerized polyisocyanate products, which in micro-encapsulated form, are employed in a paste formulation.

The surprise of the present invention is that isocyanates are very sluggish in reaction vis-a-vis the silane and that microcapsules can be formed. In addition to this, micro-encapsulation obviously occurs so rapidly that hydrolysis of the isocyanate is entirely prevented and moisture, which might damage the isocyanate, is prevented from penetrating into the microcapsule.

The micro-encapsulated isocyanates are manufactured by mixing the isocyanate constituent with the silanized polybutadiene. The mixing temperature is adjusted to the melting points of the mixed materials and as a rule ranges from 100° C. to 150° C. The cross-linking constituent and the silanized polybutadiene, in a ratio of 4:2 to 4:1, preferably 4:1, are charged into a reactor. The polybutadiene should exhibit a silicon content of 2 to 10% by weight, a molecular weight of 1500 to 2500 g/mol, a viscosity of 1000 to 3000 mPas and a solids content of greater than 60%. The mixing procedure is conducted under high shear. Also added to the mixture are approximately 0.5 to 1.5% of a commercial surfactant, e.g. Intrasol, 0.05 to 0.1% of an acid catalyst, e.g., toluenesulfonic acid and 1.5 to 5% of a thickener, e.g., acrylic acid ester thickener and other additives, if required.

A characteristic of the cross-linkable hot-melt adhesive compound of the present invention for the coating and/or laminating of surface formations is that the reactive constituents present in the hot-melt adhesive compound first react, with cross-linking, in the melt. The crosslinking constituent is added to the coating paste in the form of a micro-encapsulated polyisocyanate dispersion. In this preferred initial form, a commercial copolyamide with amino end groups and a trimerized diisocyanate, which has been rendered nonsensitive to water, is processed into a paste. The material to be processed is then coated by means of rotary screen-printing. A copolyester may be used in place of the copolyamide. A preferred embodiment of such is an OH group terminated copolyester based on terephthalic acid, isophthalic acid and butanediol or butanediol in combination with small quantities of up to 12 mole %, preferably from 6 to 10 mole %, of other diols such as, for example, hexanediol or polyethylene glycol, having melting points of 100 to 150° C. During subsequent drying in an oven at approximately 120° C. results in cross-linking within a few seconds, and a cross-linked strike back barrier for the double dot is obtained. In this way the usual problems of systems containing isocyanate can be circumvented. By way of example, other systems require blocked isocyanates, where the likes of caprolactam or oximes are used as blocking agents, and require excessively high activation temperatures. Another advantage of the present invention is that no low-boiling inflammable solvents are released during fixing, since an aqueous suspension is present.

Having now generally described this invention, a further understanding can be obtained by reference to certain specific examples which are provided herein for purposes of illustration only and are not intended to be limiting unless otherwise specified.

EXAMPLE 1

A 160 g amount of 70% polyisocyanate solution of trimerized IPDI are mixed together with 40 g of a silanized polybutadiene having a molecular weight of 1500 to 2500, a viscosity of 1000 to 3000 mPas and a solids content>60%. The result is a clear homogenous mixture. This mixture is added slowly to an aqueous solution comprising 500 g water, 10 g Intrasol, 0.5 g p-toluenesulfonic acid, 1 g defoaming agent and 30 g of a commercial aqueous thickener under high shear by means of a stirring apparatus which generates high shear forces (Ultra Thurrax). Under hydrolysis conditions the capsule-forming material immediately encapsulates the polyisocyanate by forming a waterproof shell that can be destroyed or released by pressure or heat upon the intended use.

The dispersion or the print paste prepared in this manner now has particularly advantageous properties:

The paste, which is printed as a base dot (strike back barrier) for the so-called double dot, cross-links during drying in the attached hot-air duct and melts with the scattered amine terminated copolyamide (upper dot). Bonding is particularly good because the amino end groups from the upper dot, at the boundary surface to the base dot, react with the cross-linking constituent, resulting in a fluent transition from the cross-linked base layer to the thermoplastic upper dot which guarantees actual adhesion.

To attain particularly good bonding of the upper dot onto the base dot, it is advisable to use an amine-regulated copolyamide as the upper dot material. Appropriate products for the base and upper dot are low-viscosity, low-melting grades. The melting point should range from 90 to 150° C., preferably from 115 to 130° C., with a solution viscosity in the range of 1.2 to 1.7 mPas, preferably 1.25 to 1.4 mPas. The boundary layer thereby reacts with the isocyanate paste and creates a very resistant connection of both dots. The coating quantities for the base dot should be 2 to 5 g/m$^2$, preferably 2.5 to 4 g/m$^2$, and for the upper dot the coating quantities should be 4 to 8 g/m$^2$, particularly 5 to 7 g/m$^2$. The base dot can be applied grid-like as a paste.

Internally blocked polyisocyanates, e.g., dimerized polyisocyanate, can also be processed without being encapsulated in paste because they are not susceptible to water. The use of such systems is limited to a temperature range above 150° C., for example for shirt collars, because the textiles being used here, generally cotton, tolerate higher temperatures. A paste formula, VESTAMELT X 1316-P 1 (Degussa Huels), is suitable as a hot-melt adhesive.

EXAMPLE 2

An amine-terminated copolyamide of Degussa-Huels AG (VESTAMELT X 1027-P 1) and an encapsulated polyisocyanate dispersion manufactured in the above-mentioned manner were processed into a printable paste with commercially available dispersing agents and thickeners, e.g., Intrasol 12/18/5 and Mirox TX marketed by Stockhausen, and as described in DE-B 20 07 971, DE-B 22 29 308, DE-B 24 07 505 and DE-B 25 07 504, and printed using a rotary screen printer with a CP 66 template on a 35 g polyester fabric with high bulk yarn. The coating was 2 g/m$^2$. VESTAMELT X 1027-P816 was scattered on the still wet paste dot, the excess was suctioned up and the article was dried and sintered in a drying oven at 130° C. The upper dot had a coating of 5 g/m$^2$, making the total weight 7 g/m$^2$.

Paste Formulation of the Base Dot:
 1500 g Water
 35 g Mirox TX (polyacrylic acid derivative)
 40 g Intrasol 12/18/5 (ethoxylated fatty alcohol)
 200 g polyisocyanate dispersion (approx. 5% trimerized IPDI) from Example 1

600 g VESTAMELT X 1027-P1

The amine-terminated VESTAMELT X 1027-P816 of Degussa-Huels AG was scattered as a scattering material.

Result:

A 5 cm wide strip of this interlining was fixed to a siliconized blouse material from a cotton/polyester mix at a bonding temperature of 127° C. for 10 s and a linear pressure of 4 N, after which the composite was subjected to a 60° C. wash.

Primary adhesion: 16 N/5 cm
60° C. wash: 14 N/5 cm
Back riveting: 0.1 N/10 cm

On Example 11: (Comparison to the State of the Art)

A paste system based on copolyamide polyethylene was applied to the same interlining base and scattered with the same upper dot material, then dried and sintered. The same quantities of base dot and upper dot were applied.

Paste Formulation:

1500 g Water
35 g Mirox TX
40 g Intrasol 12/18/5
400 g SCHAETTIFIX 1820 (high-density polyethylene)
200 g VESTAMELTX751-P1

The SCHAETTIFIX 1820 is a high-density polyethylene with a melting point of 128 to 130° C. and a melt index of 20 g/10 min.

Result:

Primary adhesion: 9 N/5 cm
60° C. wash: 5 N/5 cm
Back riveting: 0.9 N/10 cm

The advantage of the process of the present invention is that, under the drying conditions, the lower dot already cross-links and during melting the upper dot cross-links because of its termination with the lower dot, thereby creating an optimum bond. Since after coating the molecular weight of the lower dot is increased strongly, it can no longer sink into the fabric. During the subsequent fixing process, the low-viscosity polyamide of the upper dot is forced to flow against the material to be fixed, since it cannot flow downwards; a very high degree of adhesion is consequently attained with minimal quantities of hot-melt adhesive. The separation layer, previously the weak point of the system, particularly during washing, between upper dot and base dot cannot be attacked so strongly hydrolytically as is the case with previously known systems and it accordingly exhibits substantially higher resistance.

Products Used:

VESTAMELT X 1027-P1 is a ternary copolyamide of Degussa-Huels AG based on LL, CL and DDS/MPD with amino end groups, melting point of 120° C., amino end groups 100 to 400 mVal/kg, preferably 250 to 350 mVal/kg.

The trimerized isocyanate is a polyisocyanate with a functionality of 3 to 4 and with a melting point of 100 to 115° C. It is a product of Degussa-Huels AG.

EXAMPLE 3

1500 g Water
35 g Mirox TX
40 g Intrasol 12/18/5
400 g VESTAMELT X 1316-P1
200 g VESTAMELT X 1310-P1

Result:

A 5 cm wide strip of this interlining (75 g/m² cotton) with a CP 66 screen and a coating of 16 g/m² was fixed to a siliconized blouse material from a cotton/polyester mix at a bonding temperature of 155° C. for 16 s and a linear pressure of 4 kg/cm², on a shirt press, after which the composite was subjected to a 60° C. wash.

Adhesion: 21 N/5 cm
60° C. wash: 19 N/5 cm

Test 3a: (Comparison to State of the Art)

As in Test 3, 16 g/m² of a commercially available coating was applied to the same interlining, as per the following formulation:

1500 g Water
35 g Mirox TX
40 g Intrasol 12/18/5
600 g VESTAMELT X 250-P1

The Following Adhesions Resulted Under the Same Fixing Conditions:

Primary adhesion: 16 N/5 cm
60° C. wash: 5 N/5 cm

Result:

Hydrolysis resistance is sharply increased by cross-linking (molecular weight increase), something that becomes clearly noticeable in the wash resistance. The strike back inclination is strongly decreased by the gradual molecular weight increase during fixing, effectively increasing adhesion.

The disclosure of German priority application Serial No. 10050231.8 filed Oct. 11, 2000 is hereby incorporated by reference into the present application.

Obviously, numerous modifications and variations of the present invention are possible in light of the above teachings. It is therefore to be understood that within the scope of the appended claims, the invention may be practiced otherwise than as specifically described herein.

What is claimed is:

1. A microencapsulated adhesive component, comprising:
   a cross-linking constituent microencapsulated with a silanized polybutadiene.

2. The microencapsulated adhesive component as claimed in claim 1, wherein the cross-linking constituent is microencapsulated with a silanized polybutadiene in a ratio of 4:1.

3. The microencapsulated adhesive component as claimed in claim 1, wherein the silanized polybutadiene has a silicon content of 2 to 10% by weight, a molecular weight of 1500 to 2500 g/mol and a viscosity of 1000 to 3000 mPas.

4. The microencapsulated adhesive component as claimed in claim 1, wherein the cross-linking constituent is an isocyanate compound which has more than two reactive groups per molecule.

5. The microencapsulated adhesive component as claimed in claim 4, wherein the isocyanate compound has a melting range of 110 to 130° C.

6. The microencapsulated adhesive component as claimed in claim 1, wherein the cross-linking constituent is an isocyanate which is reactive with a second constituent which is a copolyamide or copolyester.

7. The microencapsulated adhesive component as claimed in claim 6, wherein the second constituent is an amine-terminated copolyamide with a melting range of 90 to 150° C. and a solution viscosity or relative melting viscosity $\eta/c$ in the range of 1.2 to 1.7.

8. The microencapsulated adhesive component as claimed in claim 6, wherein the second constituent is an OH group terminated copolyester prepared from terephthalic acid, isophthalic acid and butanediol or butanediol in combination with small quantities of up to 12 mole % of another diol, having a melting point of 100 to 150° C.

9. An aqueous printing paste, comprising:
   the microencapsulated adhesive component of claim 1 dispersed in an aqueous paste.

10. The printing paste according to claim 9, wherein the paste further comprises an acid catalyst, a commercial surfactant, a defoaming agent, a thickener and water.

11. An aqueous adhesive printing paste, comprising:
the microencapsulated adhesive component of claim 1 combined with a second constituent of a copolyamide or a copolyester dispersed in an aqueous paste.

12. A process, comprising:
micro-encapsulating a cross-linking constituent in a silanized polybutadiene.

13. The aqueous adhesive printing paste of claim 11, wherein the cross-linking constituent is an isocyanate compound.

14. The aqueous adhesive printing paste of claim 13, wherein the second constituent is an amine-terminated copolyamide with a melting range of 90 to 150° C. and a solution viscosity or relative melting viscosity η/c in the range of 1.2 to 1.7.

15. The aqueous adhesive printing paste of claim 13, wherein the second constituent is an OH group terminated copolyester prepared from terephthalic acid, isophthalic acid and butanediol in combination with small quantities of up to 12 mole % of another diol, having a melting point of 100 to 150° C.

16. The aqueous printing paste of claim 9, wherein the cross-linking constituent is an isocyanate.

17. A method comprising applying the aqueous printing paste of claim 13 to a substrate.

18. The method according to claim 17, wherein the aqueous paste is applied to a substrate by rotary screen printing.

19. A method of bonding surfaces, comprising:
applying the paste of claim 16 onto a surface as the base dots of double dot technology as a strike back barrier;
applying, as the upper dot component of the double dot process, an amine terminated copolyamide; and
effecting bonding between the materials of the applied dots.

* * * * *